United States Patent [19]
Masclet

[11] Patent Number: 5,727,850
[45] Date of Patent: Mar. 17, 1998

[54] SAFETY AND CONTROL SYSTEM FOR THE LOCKING MECHANISM OF A WHEEL HUB, NOTABLY FOR WHEELCHAIRS

[76] Inventor: Claude Masclet, Le Chatelard, 42210 Marclopt, France

[21] Appl. No.: 651,195

[22] Filed: May 17, 1996

[30] Foreign Application Priority Data

May 19, 1995 [FR] France .................. 95 06343

[51] Int. Cl.$^6$ .................................................. B60B 27/06
[52] U.S. Cl. ........................... 301/111; 301/122; 411/348; 403/322
[58] Field of Search .................... 301/111, 112, 301/120, 122, 124.2, 105.1; 280/287, 250.1; 403/322, 321; 74/107; 411/348; 24/453

[56] References Cited

U.S. PATENT DOCUMENTS

| | | | |
|---|---|---|---|
| 2,314,208 | 3/1943 | Gurewitsch | 411/348 |
| 2,373,083 | 4/1945 | Brewster | 411/348 |
| 5,215,356 | 6/1993 | Lin | 301/111 |
| 5,394,594 | 3/1995 | Duran | 403/321 |
| 5,458,431 | 10/1995 | Ferreol-Ragotin | 403/322 |
| 5,482,305 | 1/1996 | Jeffries et al. | 301/122 |

FOREIGN PATENT DOCUMENTS

| | | | |
|---|---|---|---|
| 2588513 | 4/1987 | France | 301/111 |

*Primary Examiner*—Russell D. Stormer
*Attorney, Agent, or Firm*—Gerald E. Linden

[57] ABSTRACT

In the hub body (1) of a wheelchair wheel hub, a quick release system is operated axially by a pushing member (6) to enable its positioning on a supporting structure. The wheel hub features, on the opposite end of its mounting side, a deep cavity allowing the positioning (placement) of a shaped ring in a set position (12–16), the latter providing the positioning and/or the guiding of a pushing member susceptible to cooperate with the locking/un-locking mechanism of the hub quick release axle, and in that a complementary mobile cap (14–18) is movable in reference to a fixed surface (12–16) with regard to control the intervention or not on the locking/un-locking mechanism of the hub.

7 Claims, 4 Drawing Sheets

SAFETY AND CONTROL SYSTEM FOR THE LOCKING MECHANISM OF A WHEEL HUB, NOTABLY FOR WHEELCHAIRS

TECHNICAL FIELD OF THE INVENTION

The invention relates to the technical field of wheel hubs, particularly for wheelchairs, and more generally to all wheel systems movable from their supporting structure (e.g., a wheelchair frame).

The "hub assembly" of the present invention is also termed "safety and control system for the locking mechanism of a wheel hub, notably for wheelchairs".

BACKGROUND OF THE INVENTION

It is well known to build wheel hubs with quick release mechanism from the receiving (supporting) structure including, but not limited to, wheelchairs. These wheel hubs are fitted with a locking mechanism which prevents unexpected release of the wheel from the supporting frame (structure). Such mechanisms have been described in French Patent No. 94.12027.

These locking or un-locking mechanisms typically employ levers or handles swiveling on the hub axis. These levers are installed projecting outwardly from the hub and have been used with great dependability and safety.

However, in practical use it is proven that such levers or handles can be the source of an external hooking (snagging on external objects) and that an insufficient clamping in the locking position can allow a release of the hub in the event of efforts or vibrations due to utilization constraints of rolling vehicles on which they are positioned.

Furthermore, and even if the lever shapes have been designed to be harmonious with the aesthetic look of the overall set-up, their mere presence remains unaesthetic (awkward). The lever hinge also remains visible and the accumulation of dirt around it due to external projections can be detrimental to the proper operation and appearance of the set-up. Moreover, there is no protection of the aforementioned lever.

SUMMARY OF THE INVENTION

Due to the aforementioned observations regarding levers or handles, the inventor's object has been to examine and research how to integrate, in the hub of the wheel, the locking mechanism as well as addressing in a simple and satisfactory manner all the constraints previously met.

The intended object of the invention was to incorporate to the operation of the hub locking mechanism, a configuration and a shape which would satisfy the demands of safety and protection of the locking and un-locking mechanism as well as addressing the aesthetic criteria, and assuring the intended objectives and in particular the protection of the locking and un-locking mechanisms.

Another object of the invention was to prevent, in case of an unexpected operation of the locking/un-locking mechanism, the possibility of removal of the hub.

These advantages and others will become apparent from the following description.

According to the invention, a safety system controlling the locking/un-locking of a wheel hub for wheelchairs includes, in the hub body, a mechanism with quick release operated axially with the use of a pushing member in order to latch it on a supporting structure (e.g., wheelchair frame).

According to a feature of the invention, the wheel hub has, on the opposite side of its fastening area, a cavity of great depth allowing the positioning in a permanent location of a shaped means, the latter allowing the positioning and/or the guiding of a pushing means susceptible to cooperate with the locking/un-locking mechanism of the hub quick release axle, and in that a complementary mobile means is movable in reference to the fixed means in view of controlling or not the operation of the locking/un-locking mechanism of the hub.

According to another feature of the invention, a notched ring is placed at the bottom of the hub, in a fixed location, and the notched ring has a profiled shape as ramps cooperating in position with a movable end added and guided in conjunction with the pushbutton part of the mechanism of the quick-release axle, the said end being adjustable angularly to define and authorize (permit) a position of intervention or non-intervention on the locking and un-locking mechanism of the hub.

Expressed in different terms, in both embodiments of the invention an axle sleeve has balls at an end portion thereof, and a pushrod mechanism alternately (selectively) caused the balls to project from the outer surface of the axle sleeve or to retract (drop back) into the axle sleeve. The balls are normally "biased" to project from the outside diameter of the axle sleeve. The wheelchair frame is provided with a receiver bushing having a bore with an inner diameter corresponding to the outer diameter of the axle sleeve. To insert the axle sleeve into the receiver bushing, a push mechanism is actuated which permits the balls to drop back (retract) into the axle sleeve so that the axle sleeve can pass freely through the bore of the receiver bushing. The balls are then caused to extend from the axle sleeve, just beyond the end of the receiver bushing, to secure the axle sleeve within the receiver bushing. To withdraw the axle sleeve from the receiver bushing, the push mechanism is similarly actuated to permit the balls to retract to within the axle sleeve. In one embodiment (FIGS. 1–3), the push mechanism is selectively permitted or prohibited from actuating (i.e., causing the balls to extend or to retract) by its rotational position and a suitable cam mechanism of notches and tabs (see, e.g., 12, 14b). In another embodiment (FIGS. 4–5), the push mechanism is selectively permitted or prohibited from actuating by a radial position of a suitable mechanism (see, e.g., 18, 18b, 17b).

Additional objects, features and advantages of the invention will become apparent in light of the following description.

BRIEF DESCRIPTION OF THE DRAWINGS

The invention is depicted in the following drawings but is not limited to those drawings.

In order to describe in a more concrete way the purpose of the invention a description now follows but is not limited by the contents of the drawings.

DETAILED DESCRIPTION

Figure 1:
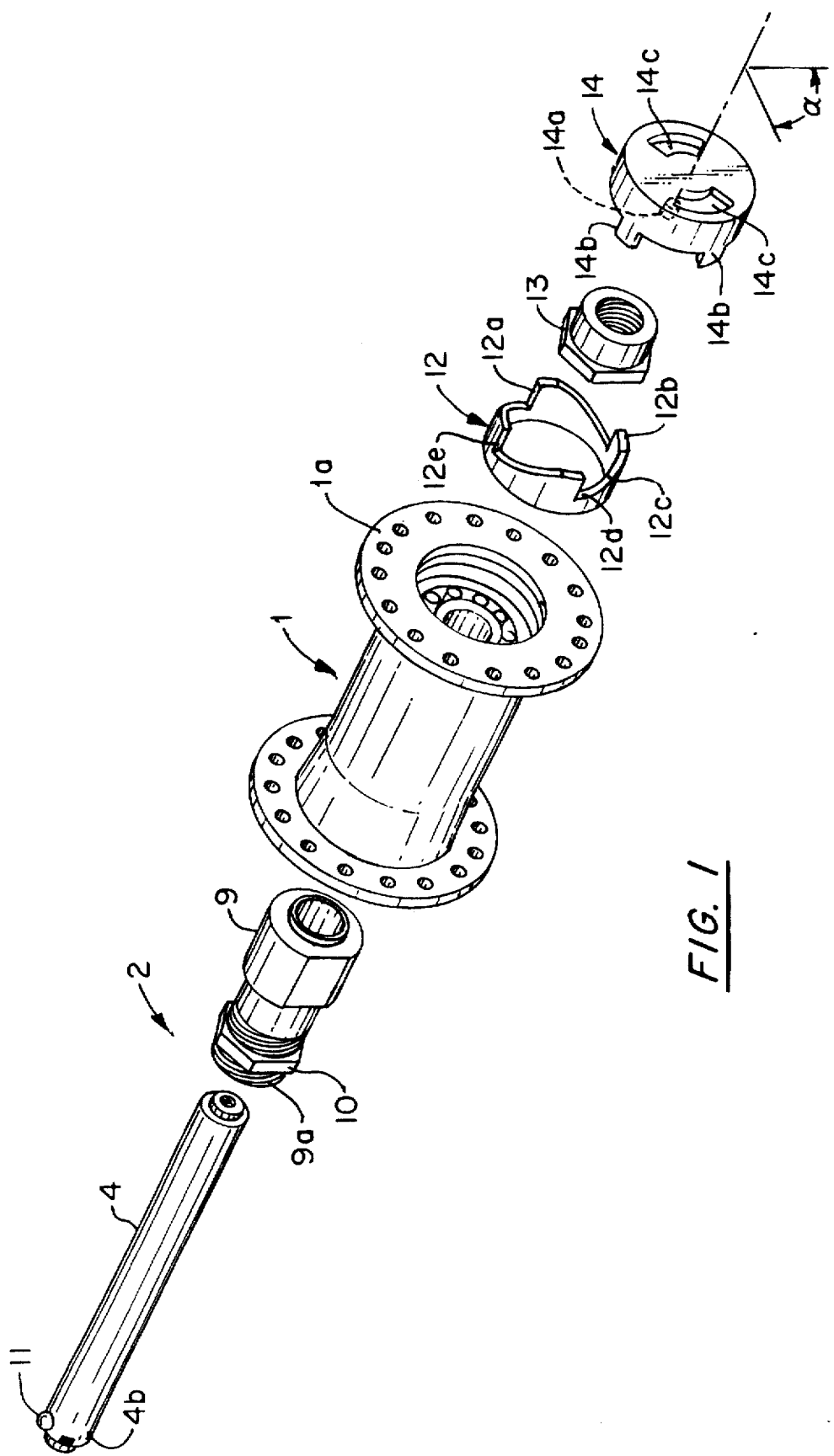
FIG. 1 is an exploded perspective view of a safety and control means for the locking/un-locking mechanism of the hub, the set-up being shown in a pictorial view before assembly and according to the first works, according to the invention.
Figure 2:
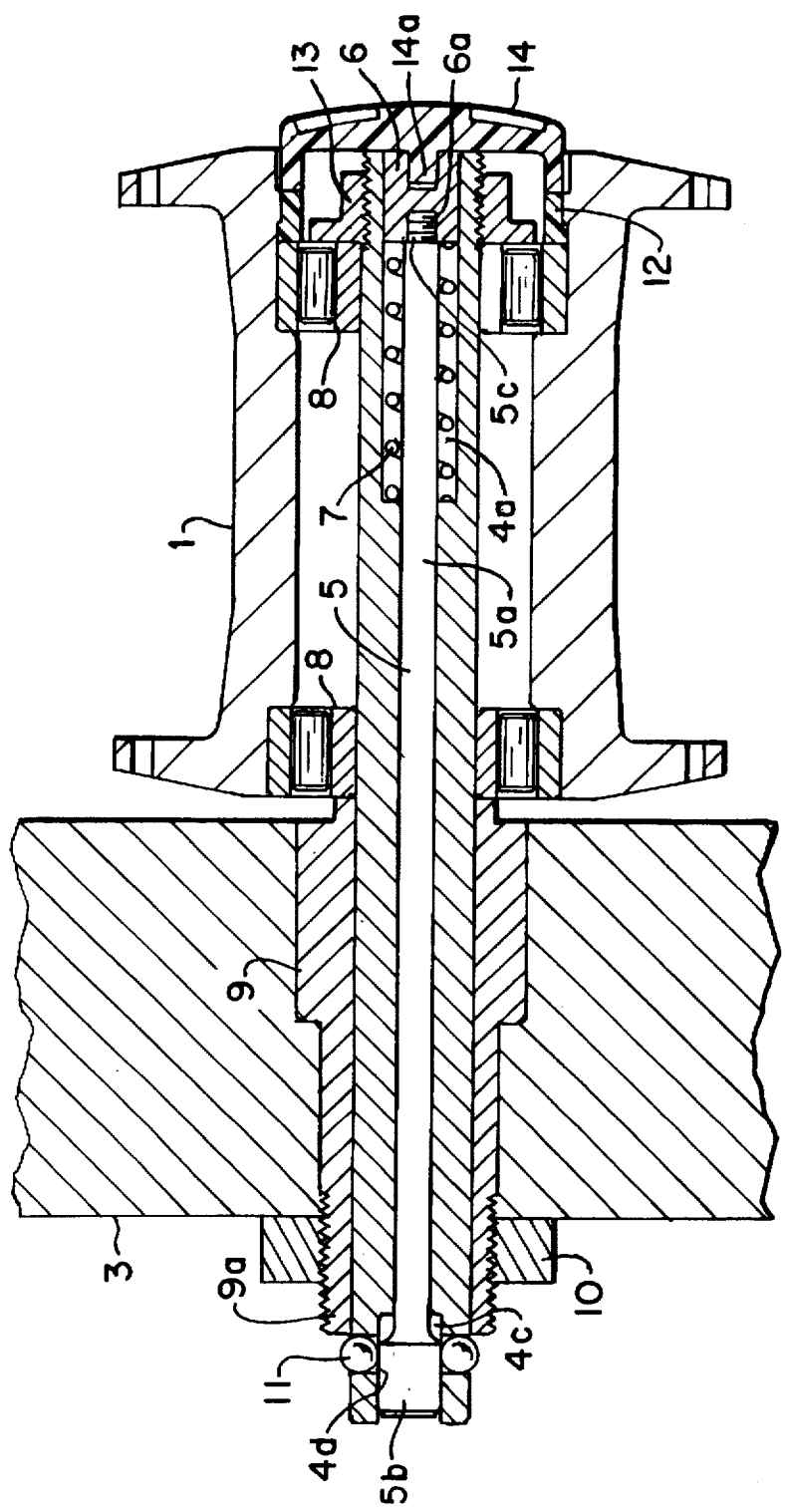
FIG. 2 is a cross-sectional view of the mechanism of FIG. 1, in an installed position, and showing in cross-section the locking mechanism according to the invention in the locked position of the hub, according to the invention.
Figure 3:
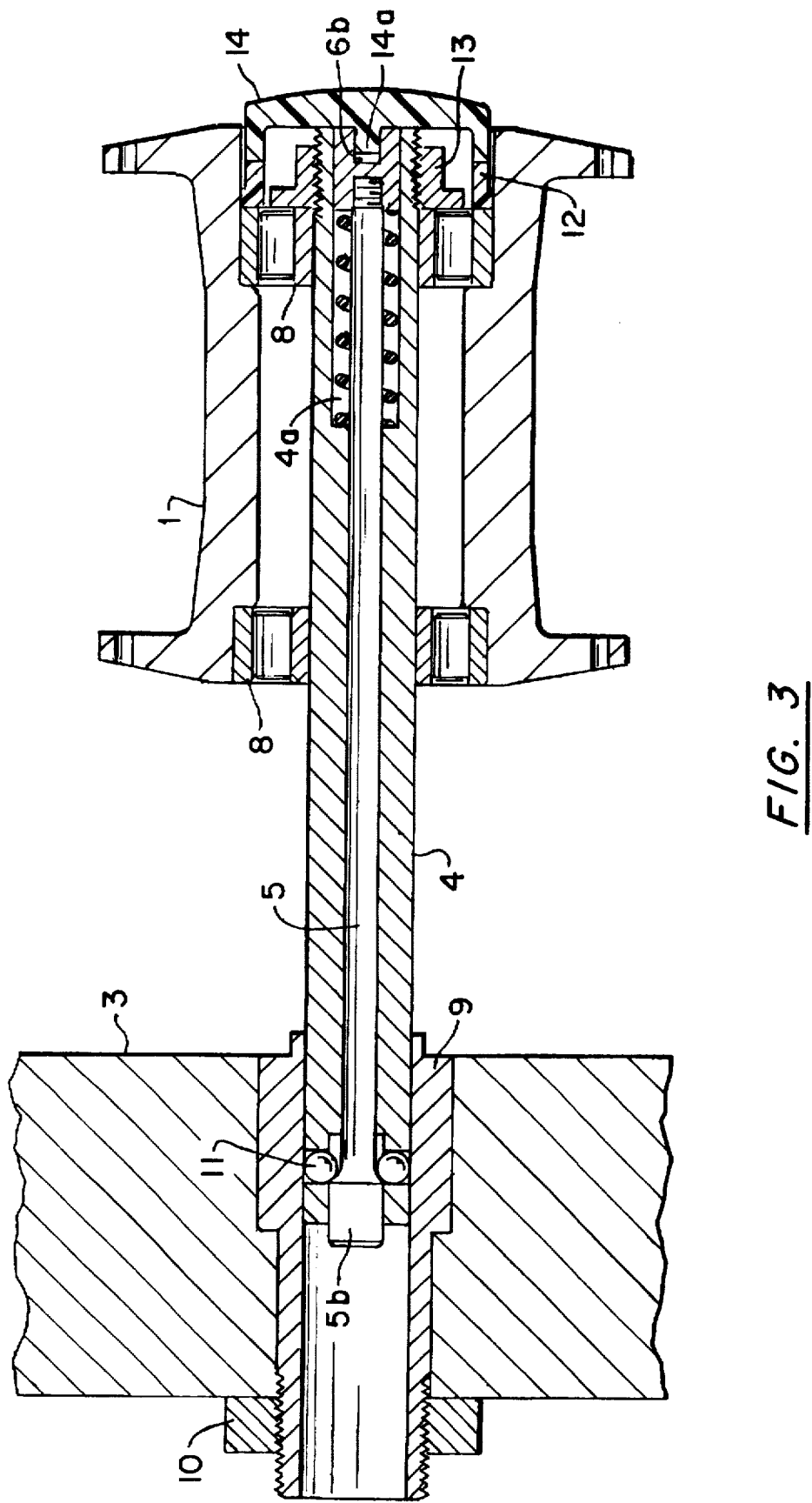
FIG. 3 is a cross-sectional view of the mechanism of FIG. 1 (in a view similar to that of FIG. 2) showing the hub during its disengaging phase, according to the invention.

With reference to FIGS. 1–3, the hub is designated in its entirety by (1) and is positioned by a mechanism with quick release mechanism designated by (2) on a supporting structure (3) which could be for example (and is particularly well-suited to being) the frame of a wheelchair. The hub encloses a cylindrical axle sleeve (4) susceptible to be fitted internally with an axle (5) (the axle 5 is also termed a "pushrod") sliding inside the sleeve by means of pushing member (6) (the pushing member is also termed a "pushpin", or "pushpin follower") acting against a spring (7). This spring is placed inside of a pre-determined cavity (4a) inside the sleeve. The aforementioned sleeve is allowed to rotate, inside the wheel hub, by means of roller bearings (8) adequately positioned. The extremity (4b) of the sleeve (4) extends outwardly from the hub (1) to allow insertion into a supporting receiver (9) shaped with a shoulder integrated in the supporting structure (3). This receiver is fitted with a threaded end (9a) on one side to allow the mounting of a fastening nut (10) securing it on the supporting structure. The sleeve (4) extends to about the plane of the extremity of the supporting receiver (9). The axle (5) inserted in the sleeve has along its length a section of a small diameter (5a) extended on its free end (5b), by a section of a larger diameter fitting inside an appropriate cavity (4c) in the sleeve. The latter has radially located openings (4d) allowing the positioning of balls (11) which escape against said axle when the pushing member (6) provokes the displacement of the axle (5), allowing the withdrawal of the sleeve (4) and thus permitting the release of the wheel hub (1) from the supporting structure (3).

According to the invention, the pushing member (6) acting on the axle (5) is shaped in the manner of a bell annulus which is capable of cooperating with the means of locking as such said.

More specifically, in a first variation, the hub (1) has a deep cavity (1a) allowing the positioning of a notched ring (12) which presses and seats against the bearing outer ring (8). This notched ring displays for example four projecting notches (12a) being inclined, symmetrical and extended in a same fashion. Each projecting notch is shaped with a horizontal stop area (12b) extended by an inclined area (12c) of reducing section up to the annular edge (12d) of the notched ring and then ending adjacent to the vertical area of the next projecting notch.

On the sleeve, is featured a nut (13) allowing resting against the internal cage of the bearing. The pushing member (6) is fastened firmly on the axle (5) by an arrangement of threaded (5c) and tapped (6a) sections complementary or otherwise. The pushing member (6) has on its outwards side an opening (6b) allowing the positioning of a post (14a) being an integral part and located in the center of the internal area of a disk-shaped push-cap (14). The latter has fingers (14b) (the fingers 14b are also termed "tabs, or "posts") of similar number as the projecting notches (12a) featured on the notched ring (12). The push-cap is established in a cylindrical section susceptible to allow its positioning into a corresponding cavity in the hub in order to cooperate With the notched ring in the configurations presented thereafter. This push-cap has multiple functions. Firstly it provides for the operator the means of manually pushing to allow the locking or un-locking of the wheel hub. Secondly, it provides a way to protect and eventually serves as a waterproof shield against the outside environment for the corresponding cavity (1a) and the bearing nearby. Thirdly and essentially, the said push-cap, allows by angularly changing its orientation (o), to activate the locking/un-locking mechanism of the hub or on the contrary to prevent all manipulation and movement of the latter.

This is achieved by the operation and the positioning of the push-cap (14) in reference with the notched ring (12). The push-cap is positioned and held in place by a snap ring preferably in the hub cavity. The notched ring which is placed resting at the bottom of the said cavity, according to its position, will be facing the fingers of the push cap on the inclined areas of its projecting notches. The push cap is susceptible of an angular orientation (o) of 90 degrees approximately. When the tip of the fingers are located at the base of the notch of the notched ring, it is possible to move the push-cap and to displace it axially to allow the transmission of its displacement to the pushing member (6) associated with the axle (5) permitting the disengagement of the balls located at one end of the axle. The outward and visible side of the push cap (14) includes indentations (14c) to facilitate its orientation.

To ensure the prevention of operation and un-locking of the hub, the angular rotation of the push-cap, by 90 degrees, will allow the positioning of the fingers on the crest of the inclined areas of the notched ring thus preventing the axial movement of the push-cap. The latter then cannot, by its location, allow the displacement of the axle (5) and therefore one achieves the impossibility to act upon the locking or un-locking of the hub.

With this design extremely easy to elaborate, the push-cap displays indentations to facilitate the positioning of finger tips; the user can very easily position said push-cap in order to lock in place the mechanism responsible for the hub release. Furthermore this push-cap shaped as a disk is designed with a side being perfectly aligned with one of the hub's flanges, thus producing a new look with no area that could cause/an external hooking. The set-up is simple to carry out. Moreover the push-cap can receive external markings for advertising or other purposes. The push-cap and the notched ring are best made in the same material such as a plastic material for example.

Figure 5:
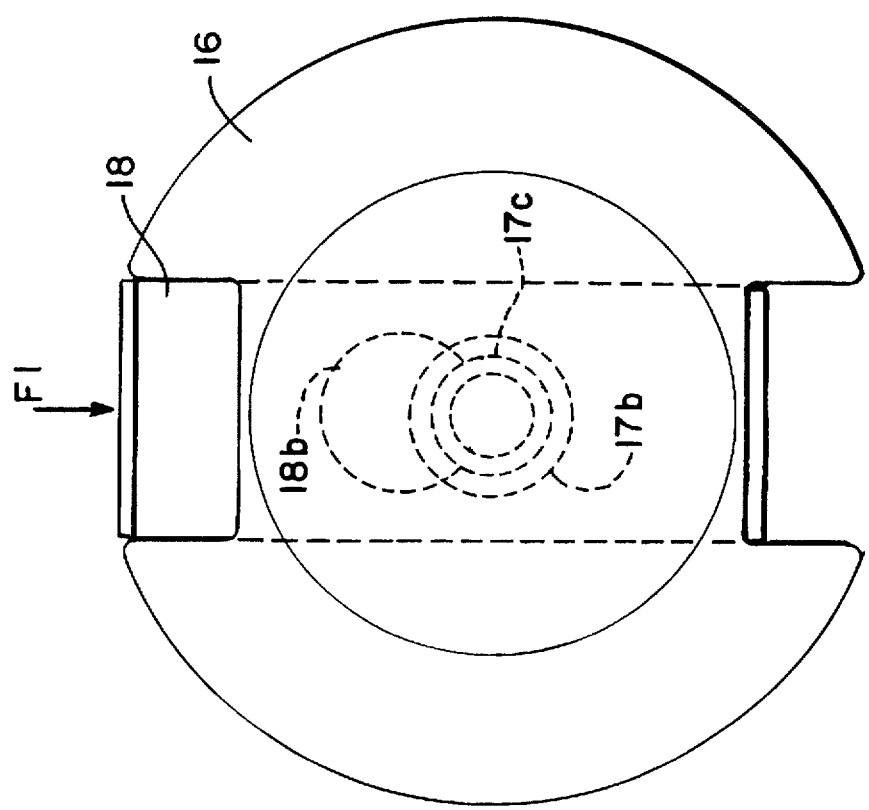
FIG. 5 is a front view of the hub of FIG. 4, according to the invention.
Figure 4:
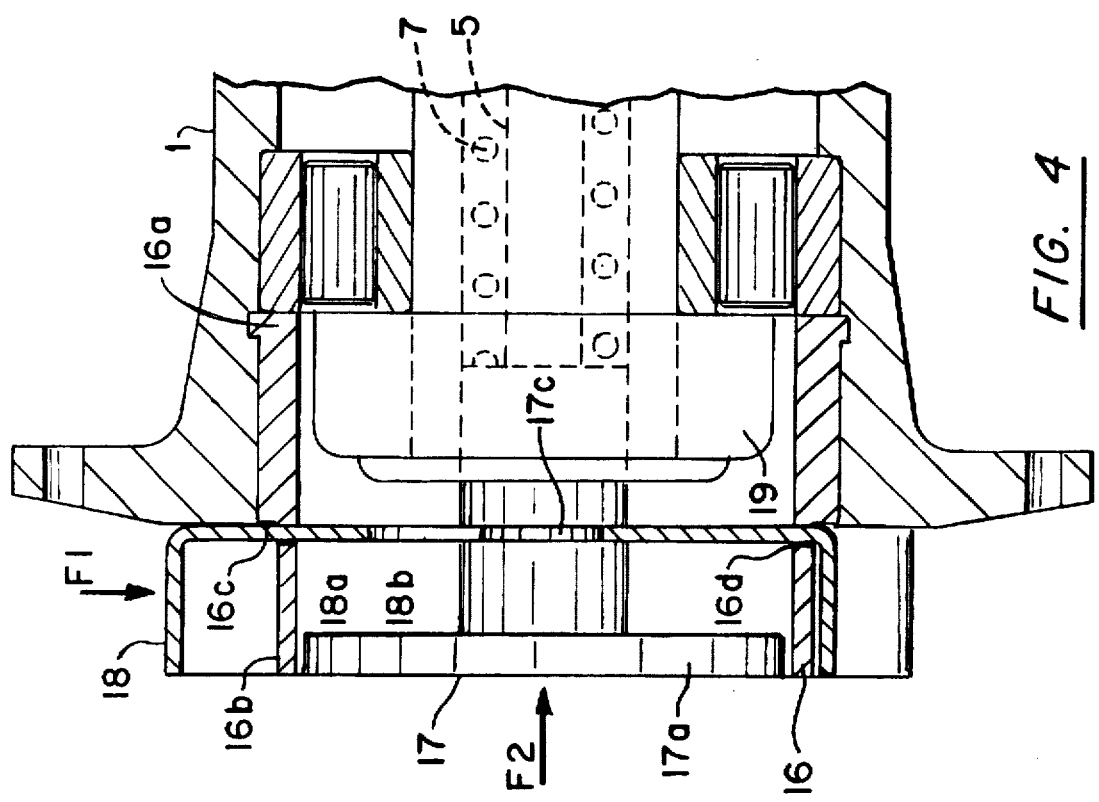
FIG. 4 is partial and cross-sectional view of an alternate embodiment of the hub of the invention.

According to the design variation (alternate embodiment) depicted in FIGS. 4 and 5, the wheel hub is fitted in its cavity (1a) with a cylindrical body (16) of long length susceptible to extend outwards of the said hub. This body (16) rests on one of its sides (16a) against the outer ring of the bearing (8) located in the hub. It is extended forward by a section (16b) of smaller diameter in order to create a stepped level (16c) positioned in the extension of the corresponding outward flange of the hub. This shaped body permits the centering of a push button (17) accessible by the operator which presents a circular disk (17a) extended by a cylindrical bearing boss (17b). The latter is positioned and fixedly secured on the extremity of the axle (5), while being able to provoke the displacement of the aforementioned against the spring (7) of the type pre-cited. In this design, the bearing boss (17b) has a groove (17c). Starting at the end of the hub body (16) a cup-shaped element (referred to herein as a "cupel") (18) is positioned and it is able to shift radially according to the arrow (F1). This cupel has a base (18a) which is positioned against the hub body (16) through a guiding slot (16d) in the latter. A central opening is planned in the base of the cupel and its diameter is slightly larger than the bearing boss (17b) of the push button. The cup-shaped element is thus guided and supported against the support surface (16c). A stop ring is secured onto the sleeve (4) and resting against the inner ring of the bearing (8). In the locking position of the push button, the said cupel by its base penetrates slightly into the groove (17c) preventing the displacement of the push button according to the arrow (F2). There is in this case an impossibility to shift the push button and therefore to allow an unexpected release of the hub in reference to its supporting structure. This second variation in design of the mechanism to insure control and security is also easy to carry out. It also includes the concept of protection of the push cap.

The advantages stand out well from this invention. One can appreciate this new concept and a better safety factor in the control of the locking and un-locking or protection of the aforementioned mechanisms.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. Hub assembly for a wheelchair, said wheelchair having a frame member, comprising:
   a hub body having a first end and a second end opposite the first end, having a central cavity extending axially from the first end to the second end;
   a first bearing disposed in the central cavity at the first end of the hub body;
   a second bearing disposed in the central cavity and recessed from the second end of the hub body;
   an axle sleeve having a first end and a second end opposite the first end, and a bore extending axially through the entire axle sleeve;
   at least two holes disposed at the first end of the axle sleeve extending radially from the bore;
   at least two balls, each disposed in a corresponding one of the at least two holes;
   a pushrod having a first end and a second end opposite the first end, and a nominal diameter;
   a region of increased diameter, greater than the nominal diameter, at the first end of the pushrod;
   means for moving the pushrod in an axial direction for alternately:
   (a) causing the region of increased diameter to urge the at least two balls through the holes so as to extend partially therefrom; and
   (b) allowing the balls to drop back into the holes towards a portion of the pushrod having the nominal diameter;
   wherein the means for moving the pushrod comprises a pushcap disposed at the second end of the hub body and accessible to a user;
   wherein: the pushcap is provided with tabs; and further comprising: a notch ring having notches corresponding to the tabs;
   wherein: in a one rotational position of the pushcap, the notch ring permits the pushcap to exert an axial force on the pushrod; and
   in another rotational position of the pushcap, the notch ring prohibits the pushcap from exerting an axial force on the pushrod.

2. Hub assembly, according to claim 1, further comprising:
   a receiver bushing, adapted in use, for being securely fastened to the frame member, and having a bore extending axially therethrough, said bore having an axial length, and adapted in use for receiving the axle sleeve through the bore.

3. Hub assembly, according to claim 2, wherein:
   (a) when the axle sleeve is inserted through the bore of the receiver bushing and the balls extend partially from the holes, the axle sleeve is securely retained within the receiver bushing; and
   (b) when the balls drop back into the holes of the axle sleeve, the axle sleeve can be inserted into or withdrawn from the receiver bushing.

4. Hub assembly, according to claim 1, wherein:
   the first bearing is flush with the first end.

5. Hub assembly, according to claim 1, wherein:
   the means for moving the pushrod further comprises:
   a spring urging the pushrod in a one axial direction.

6. Hub assembly, according to claim 5, further comprising:
   a pushpin for urging the pushrod in an opposite axial direction.

7. Safety and control mechanism for the locking/unlocking of a wheel hub specifically for wheelchairs comprising in the hub body (1), a quick release assembly actuated axially with the use of a push-pin (6) in order to secure the wheel hub to a supporting structure, characterized in that:
   shaped means disposed within a cavity on the opposite end of the wheel hub from its mounting side, for allowing the positioning and the guiding of a pushing member cooperating with the locking/un-locking system on the quick release axle of a hub;
   a complementary mobile means (14–18) which is movable in reference to a fix means (12–16) for selectively controlling the intervention on the locking/un-locking mechanism of a hub;
   at the bottom of the hub (1a), is fixedly placed a notched ring (12) exhibiting projecting notches being ramps (12a), cooperating in position with a movable push-cap (14) linked to and guided in reference to the pushing member integral part of the quick release axle, said push-cap (14) being angularly orientable to selectively authorize a position of intervention on the locking/unlocking mechanism of the hub;
   the notched ring (12) exhibits projecting notches (12a) including a raised horizontal area (12b) extended by a inclined area (12c) of reducing section until the annular edge (12d) of the ring, a stop area (12e) limiting the rotation of the push-cap;
   said push-cap includes fingers susceptible to cooperate and adjust themselves in position on the projecting notches of the notched ring;
   said push cap includes, inside and in its median and axial area, a post (14a) capable of engaging on the pushing member (6); and
   the outward and visible side of the push cap includes indentations (14c) to facilitate its orientation.

* * * * *